July 18, 1950  S. MÖHL  2,515,565
MOTOR UNIT FOR DRIVING A SHAFT AT VARIABLE SPEED
Filed Feb. 5, 1946  2 Sheets-Sheet 1
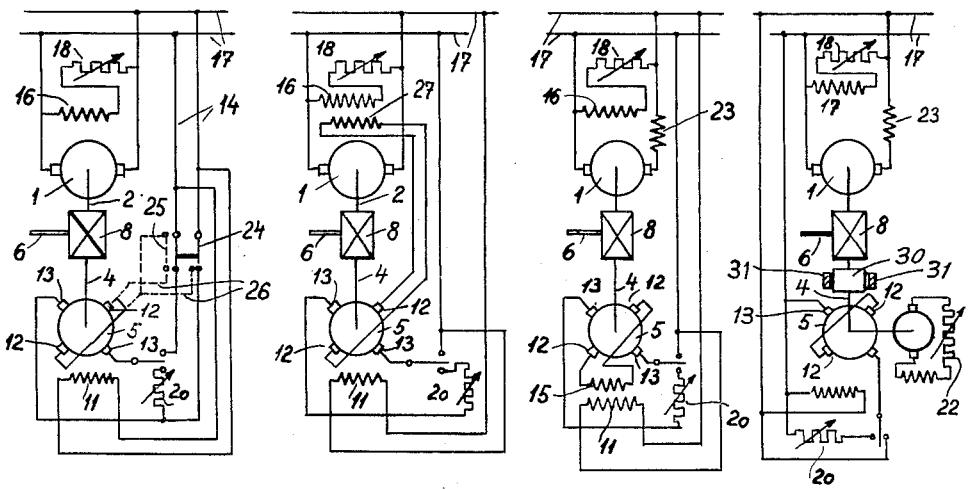
Fig. 2  Fig. 9  Fig. 10  Fig. 11
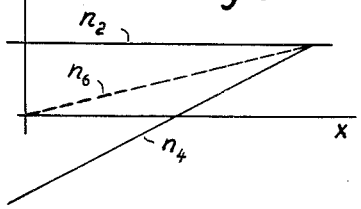
Fig. 3
Fig. 4
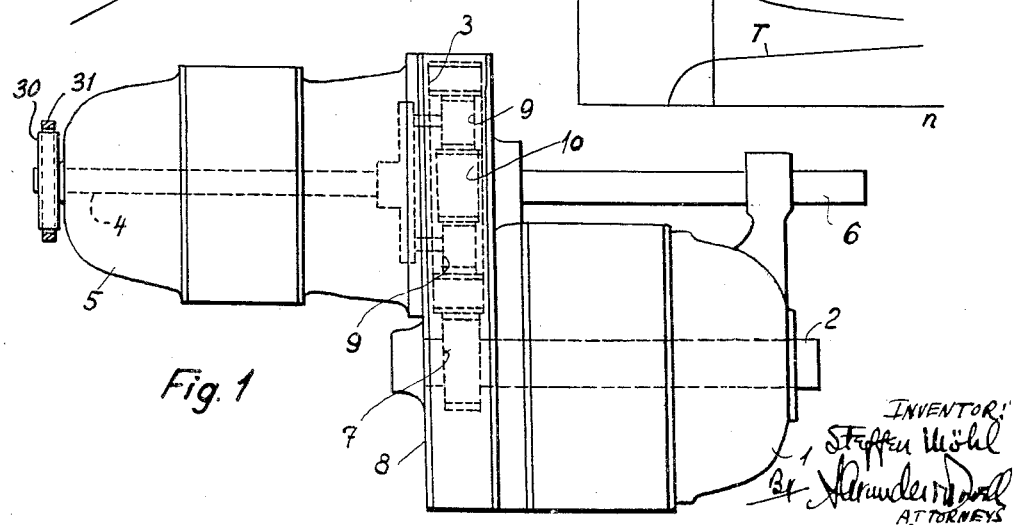
Fig. 1
INVENTOR:
Steffen Möhl
BY
ATTORNEYS July 18, 1950          S. MÖHL          2,515,565
MOTOR UNIT FOR DRIVING A SHAFT AT VARIABLE SPEED
Filed Feb. 5, 1946          2 Sheets-Sheet 2
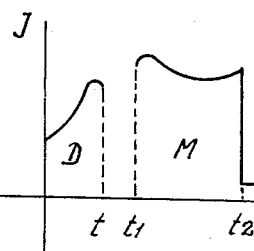
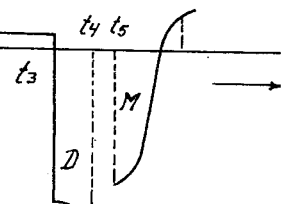
Fig.5.
Fig.6.
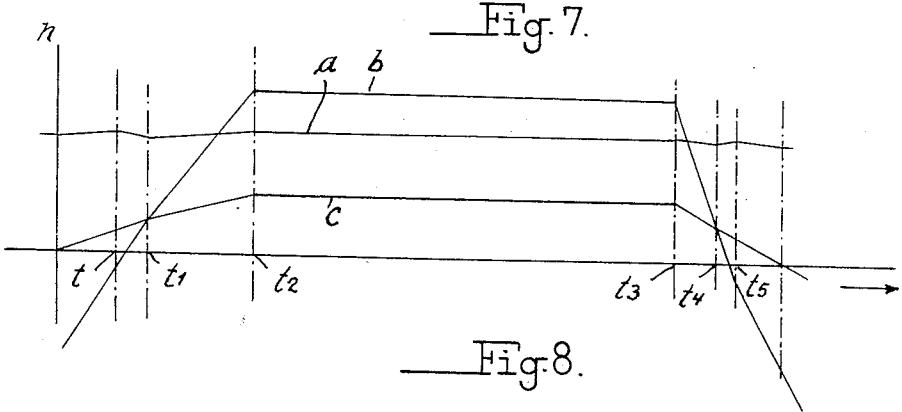
Fig.7.
Fig.8.
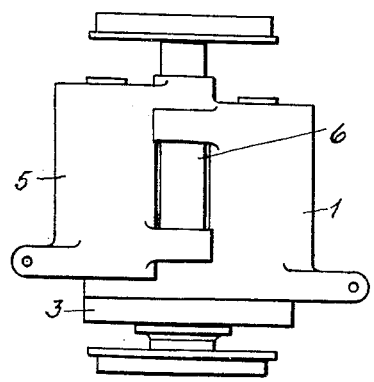

Patented July 18, 1950

2,515,565

UNITED STATES PATENT OFFICE 2,515,565

MOTOR UNIT FOR DRIVING A SHAFT AT VARIABLE SPEED

Steffen Möhl, Copenhagen, Denmark

Application February 5, 1946, Serial No. 645,653
In Sweden February 16, 1944

Section 1, Public Law 690, August 8, 1946
Patent expires February 16, 1964

8 Claims. (Cl. 318—8)

The present invention relates to a motor unit of the kind used for driving a shaft at a variable speed and comprising a main motor, preferably an electric motor of the constant speed type, which means a motor revolving at a speed that varies only slightly with the load on this motor, and one or more auxiliary electric D. C. machines having a series characteristic, and a differential gear operatively connecting the said motor and the said machine or machines and the shaft to be driven so as to provide for a variation of the speed of revolution of the said shaft by varying the number of revolutions of the said machine or machines.

Various types of motor units of this kind are known, but they all have a relatively low efficiency, and a variation within wide limits of the speed of the driven shaft by varying the speed of the auxiliary motor is only possible by means of a rather complicated controlling device.

The present invention has for its purpose to devise a motor unit of the said kind, in which a high efficiency is obtained as well as a possibility of a great variation of the number of revolutions of the driven shaft substantially only by variation of the number of revolutions of the auxiliary machine. For this purpose, in the motor unit the auxiliary machine, or if more auxiliary machines are used then each of these machines, is an electrical D. C. cross-field machine. Such a motor unit presents very essential advantages in respect of obtaining a high efficiency and great possibilities of variations for the driven shaft as well as a simple construction of the controlling device serving to control the motor unit, which controlling device, where the main motor is constructed as an electric D. C. shunt motor, which is usually the case, may be constructed with a small number of contact positions. For the sake of simplicity it is assumed below that only a single auxiliary machine is used.

When the principal motor is started, it drives the auxiliary machine as a dynamo by way of the said differential gearing. The dynamo is braked either regeneratively or by means of an ohmic resistance.

During the acceleration of the driven shaft the auxiliary machine is gradually stopped, and then, during the continued operation of the main motor, is caused to change its direction of rotation and to run as a motor, and it continues to do so until the highest speed of rotation of the driven shaft has been obtained.

The differential gearing may advantageously be dimensioned in such a manner that its planetary gears, that are coupled to the auxiliary machine, are practically stationary, when the driven shaft runs at its maximum speed.

A cross field machine has the particularly valuable quality that its torque and current intensity vary little with the speed within a very great range of speeds. As the differential gearing at the same time has the effect that the torques of the two machines must be equal, also the torque exerted on the driven shaft will vary little with the speed.

However, a cross field machine has the drawback that it is not capable of working at low numbers of revolutions. It is, therefore, necessary to take special measures to cause it to change its direction of rotation, in the following referred to as the "reversion" of the machine, and for this purpose it would be possible e. g. suddenly to change the field of the main motor, which change would cause a variation of the speed of both machines and an abrupt reversion of the auxiliary machine. However, at the same time the said change would cause a sudden, though temporary change of the torque on the driven shaft, and therefore in the case of reversion the brush connections of the auxiliary machine should preferably simultaneously be shifted, so that during the reversion the machine works as a series or shunt machine.

It is a peculiarity of the function of a motor unit according to the invention that during the greater part of the acceleration and also the greater part of the braking the output is determined by the characteristic of the auxiliary machine.

If the main motor is a D. C. shunt motor, it may in certain cases be advantageous, according to the invention, to provide the poles of the main motor, in addition to the usual shunt winding or other winding for constant magnetizing, with a special winding, through which the short circuit current of the auxiliary machine flows, so that when the driven shaft is started, the number of revolutions of the main motor increases, while the number of revolutions of the auxiliary machine decreases, until the latter passes through the value zero, and the auxiliary machine is reversed, whereafter the number of revolutions of the latter machine increases, while the number of revolutions of the main machine continues to increase.

Instead of braking the auxiliary machine regeneratively or by means of an ohmic resistance when it runs as a dynamo, it may be braked by being coupled to a dynamo or brake.

Further details of the invention will appear from the following description with reference to the drawing, in which Fig. 1 shows a motor unit in side view, Fig. 2 shows a diagram of circuit connections of a motor unit.

Figs. 3-7 four diagrams, and

Fig. 8 a modified embodiment of a motor unit in top view.

Figs. 9, 10, and 11 show three further diagrams of different circuit connections of the motor unit.

The motor unit in Fig. 1 consists of a main motor 1 of the constant speed type, this motor being preferably an electric D. C. shunt motor (Fig. 2) or a D. C. compound motor (Fig. 11), the shaft 2 of which is coupled to the shaft 4 of an electric D. C. cross-field machine 5 and to a driven shaft 6 by means of a differential gearing 8 which in the preferred form is of the planetary type, but this is not essential. The shaft 6 is coupled, in a manner not shown, to a working system, e. g. the driving wheels of a vehicle such as a tram or a locomotive. 30 is a brake drum rigidly attached to the shaft 4 of the auxiliary machine 5 whilst 31 are braking shoes arranged in the well known manner along the circumference of the brake 30 to cooperate the same when a braking is desired.

As indicated in dotted lines in Fig. 1, the shaft 2 of the main motor is coupled to the ring gear 3 of the planetary gear 8 and the shaft 4 of the cross-field motor is coupled to the planetary wheels 9 carried by said shaft, whilst the driven shaft 6 is coupled to the control pinion 10 of the planetary gear so as to be driven at a speed depending on the speeds of the two shafts 2 and 4. The speed of rotation of the cross-field machine 5 is variable within a very great speed range, advantageously a range extending over a great interval on both sides of a zero value of this speed, so that the speed of rotation of the driven shaft may be regulated practically from a zero value to a positive maximum value as diagrammatically illustrated in Fig. 3, where the number of revolutions $n_6$ of the driven shaft is plotted against the number of revolutions $n_2$ of the principal motor and the number of revolutions $n_4$ of the auxiliary machine. $x$ is the axis of abscissae for these curves.

As main motor a motor is used, the speed of rotation of which only varies slightly with the load on the motor, preferably a D. C. shunt motor or compound motor; however, a synchronous or asynchronous A. C. motor, or an internal combustion engine, e. g. a Diesel engine or a gasoline motor with automatic speed governor, may also come into consideration.

In the embodiment shown on the drawing the main motor is a D. C. motor.

The auxiliary machine is, as mentioned, above a D. C. electric cross-field machine, preferably of the Rosenberg-type, which means an electric D. C. machine in which the field magnet windings 11 are separately energized and in which the ordinary brushes 12 at the commutator are short circuited, whereas a separate set of brushes 13 are arranged in the neutral zone of the commutator and connected up in the supply circuit or output circuit of the machine as indicated in Figs. 2, 9, 10 and 11.

Fig. 4 shows quite diagrammatically the dependence between the current and the number of revolutions of a D. C. shunt motor and a cross field machine. H is the characteristic of the shunt motor, and S the characteristic of a cross field machine, when driven independently as a motor. When such machine is driven as a motor, the characteristic of the cross field machine may be caused to assume approximately the same shape as the characteristic T, which this machine normally has when driven as a dynamo, and which is particularly advantageous, because the output is practically constant within a great range of speeds. This shape of the motor characteristic may be obtained simply by countercompounding the field of the auxiliary machine by means of a compound winding 15, Fig. 10, connected up in the circuit of the interconnected brushes 12 of this machine. 16 is the ordinary field winding of the main motor. 1 and 17 are the main conductors from a constant voltage supply source not shown. 18 is a variable control resistance in the circuit of the field windings 16.

Figs. 5-6 show the variations of the current load of the motor unit with time, the latter being plotted as abscissa. During the acceleration of the driven shaft the auxiliary machine will run as a dynamo until the reversion begins, viz. at the time $t$, Fig. 5, i. e. while the speed of rotation of the driven shaft is relatively low. When the reversion has been effected, which takes place in the time interval $t$—$t$, Fig. 5, in which interval the current is not represented in Fig. 5, the auxiliary machine runs as a motor and continues to do so, when the acceleration has come to an end, i. e. at the time $t_3$, until a braking is effected at the time $t_4$. This is effected by switching over the connections of the auxiliary machine, so that at the direction of rotation in question it works as a dynamo at greater speeds, feeding current either to a loading resistance 20, Fig. 4, or to the main supply 17, and thereafter, when the reversion under braking has come into effect, which takes place in the time interval $t_4$—$t_5$, again runs as a motor. Fig. 6 shows how the corresponding torque exerted by the motor unit on the driven shaft varies with time, and this figure needs no detailed explanation. No change of the connections of the principal motor during operation is necessary.

Fig. 7 shows how the speed of rotation of the main motor, the auxiliary machine and the driven shaft vary with time, $a$ being the characteristic of the main motor, $b$ that of the auxiliary motor and $c$ that of the driven shaft.

If the main motor is not intended for running at small numbers of revolutions, and if the auxiliary machine is intended for running slowly for short time intervals only, the cooling conditions are suitable for using electric machines. A shunt motor as main motor has the valuable quality that its load automatically adjusts itself proportionally to the torque of the auxiliary machine. When the number of revolutions of the main motor is in the vicinity of the optimum value, its efficiency is high, and also the total efficiency of the unit will, therefore, be relatively favourable throughout the starting range.

The planetary gearing system in the differential transmission is advantageously dimensioned in such a manner that the planetary gears are stationary, when the driven shaft runs at its maximum speed.

For special purposes the simplest start may be obtained by braking the shaft of the auxiliary machine by means of a mechanic brake. This involves the use of a block brake, a band brake or an electric or hydraulic brake. It is also possible, however, as a brake to use a series machine 21, Fig. 11, which is driven as a dynamo by the auxiliary machine and is connected to an ohmic resistance 22. The maximum speed of rotation of the driven shaft is obtained when the shaft 4 of the controlling motor is stalled. If now this shaft is coupled to a series motor, the maximum speed of the driven shaft may be increased to any desired value.

With a view to possible variations of the supply voltage of the motors, e. g. in the case of railway service, it will be advantageous to provide a compound winding 23, Fig. 11, on the poles of the main motor, so that the influence of the voltage variations on the flux density in the principal motor is partly eliminated. The term "shunt motor" therefore, in the present connection, should be understood as also comprising compounded shunt motors.

A cross-field machine has the drawback that it is not capable of working at low numbers of revolutions. It is, therefore, necessary to take special measures to cause it to change its direction of rotation, in the following referred to as the "reversion" of the machine, and for this purpose it would be possible, e. g. suddenly to change the field of the main motor, which change would cause a variation of the speed of both machines and an abrupt reversion of the auxiliary machine 5. However, at the same time the said change would cause a sudden, though temporary change of the torque on the driven shaft, and therefore in the case of reversion the brush connections of the auxiliary machine should preferably simultaneously be shifted, so that during the reversion the machine works as a series or shunt machine. For this purpose a change-over switch 24, Fig. 2, may be arranged in the conductors 14 feeding current to the brushes 13 and as indicated in dotted lines in Fig. 2 the short-circuit connection between the brushes 12 may be effected not directly but through a circuit breaker, being automatically opened when the change-over switch 24 is shifted, so as to connect the conductors 14 to the brushes 12 by way of the conductors 26 shown in dotted lines in Fig. 9.

It may in certain cases be advantageous, according to the invention, to provide the poles of the main motor 1, in addition to the usual shunt winding 16 or other winding 23 for constant magnetizing, with a special winding 27, Fig. 9, through which the short circuit current or armature current of the auxiliary machine 5 or part of one of these current flows, so that when the driven shaft is started, the number of revolutions of the principal motor increases, while the number of revolutions of the auxiliary machine 5 decreases, until the latter passes through the valve zero, and the auxiliary machine is reversed, whereafter the number of revolutions of the latter machine increases, while the number of revolutions of the main motor 1 continues to increase.

Instead of arranging one of the two machines, 1 and 5 co-axially to the driven shaft 6, as shown in Figs. 1 and 2, the two motors may be arranged on opposite sides of the driven shaft, as shown in Fig. 8. This is of considerable importance with a view to the space conditions, e. g. in motor cars for railway service.

Having now particularly described and ascertained the nature of my invention and in what manner the same is to be performed, I declare that what I claim is:

1. A motor unit for driving a shaft at variable speed comprising a driving motor of the constant speed type, an electric D. C. machine of the cross-field type and a planetary gear operatively connecting the said shaft and the said motor and the said cross-field machine, and control means for the cross-field machine to provide for a variation of the speed of revolution of the said shaft by varying the manner of operating said control means of the cross-field machine.

2. A motor unit for driving a shaft at variable speed comprising an electric D. C. motor of the constant speed type, an electric D. C. machine of the cross-field type and a planetary gear operatively connecting the said shaft and the said motor and the said cross-field machine, and control means for the cross-field machine to provide for a variation of the speed of revolutions of the said shaft by varying the manner of operating the control means of the cross-field machine.

3. A motor unit for driving a shaft at variable speed comprising an electric D. C. driving motor of the constant speed type, an electric D. C. machine of the cross-field type, a planetary gear operatively connecting said shaft and said motor and said machine, control means for the cross-field machine to provide for a variation of the speed of revolution of the said shaft, and means for reversing the direction of rotation of the cross-field machine for varying the number of revolutions of the driven shaft while continuously running the D. C. driving motor.

4. A motor unit for driving a shaft at variable speed comprising an electric D. C. motor of the constant speed type, an electric D. C. machine of the cross-field type, means for loading the said machine to a variable degree, a planetary gear operatively connecting said shaft and said motor and said cross-field machine, and control means for the cross-field machine to provide for a variation of the speed of revolution of the said shaft when varying the load of the said cross-field machine and means for reversing the direction of rotation of the said cross-field machine.

5. A motor unit for driving a shaft at variable speed comprising an electric D. C. motor of the constant speed type, an electric D. C. machine of the cross-field type, means for loading the said machine to a variable degree, a planetary gear operatively connecting said shaft and said motor and said cross-field machine, control means for the cross-field machine to provide for a variation of the speed of revolution of the said shaft when varying the manner of operating the control means for the said cross-field machine, a compound winding arranged on the poles of the said motor and connected up in such manner in one of the circuits through the armature of the cross-field machine that the current flowing through said winding when starting the shaft to be driven will cause the said winding to weaken the field of said motor and consequently cause the number of revolutions of said motor to increase.

6. A motor unit for driving a shaft at variable speed comprising an electric D. C. motor of the constant speed type, an electric D. C. machine of the cross-field type, means for loading the said machine to a variable degree, a planetary gear operatively connecting said shaft and said cross-field machine, control means for the cross-field machine to provide for a variation of the speed of revolutions of the said shaft, when varying the manner of operating the control means for the cross-field machine, a compound winding arranged on the poles of the said motor and connected up in the circuit of the short-circuited brushes of the cross-field machine that the current flowing through said winding when starting the shaft to be driven will cause the said winding to weaken the field of said motor and consequently cause the number of revolutions of said motor to increase.

7. A motor unit for driving a shaft at variable speeds, comprising a driving motor of constant speed type, an electric D. C. machine of the cross-field type, a planetary gear operatively connecting said shaft and said motor and said machine; and means for reversing the direction of rotation of the cross-field machine for varying the number of revolutions of the driven shaft.

8. A motor unit for driving a shaft at variable speeds, comprising a driving motor of the constant speed type, an electric D. C. machine of the cross-field type, means for loading the said machine to a variable degree, a planetary gear operatively connecting said shaft and said motor and said cross-field machine, control means for the cross-field machine for varying the manner of operating the control means of the cross-field machine, a compound winding arranged on the poles of the said motor and connected up in such manner in one of the circuits through the armature of the cross-field machine that the current flowing through said winding when starting the shaft to be driven will cause the said winding to weaken the field of said motor and consequently cause the number of revolutions of said motor to increase.

STEFFEN MÖHL.

REFERENCES CITED

The following references are of record in the file of this patent:

UNITED STATES PATENTS

| Number | Name | Date |
|---|---|---|
| 1,270,028 | Henderson | June 18, 1918 |
| 1,828,948 | Rossman | Oct. 27, 1931 |
| 1,837,803 | Weston | Dec. 22, 1931 |

FOREIGN PATENTS

| Number | Country | Date |
|---|---|---|
| 559,056 | Great Britain | Feb. 2, 1944 |